United States Patent
Johann et al.

(10) Patent No.: US 12,491,475 B2
(45) Date of Patent: Dec. 9, 2025

(54) INSTALLATION SYSTEM COMPRISING A WASTEWATER LINE

(71) Applicant: BWT Holding GmbH, Mondsee (AT)

(72) Inventors: Jürgen Johann, Mondsee (AT); Katharina Weitgasser, Wals (AT)

(73) Assignee: BTW Holding GmbH, Mondsee (AT)

( * ) Notice: Subject to any disclaimer, the term of this patent is extended or adjusted under 35 U.S.C. 154(b) by 382 days.

(21) Appl. No.: 18/035,548

(22) PCT Filed: Nov. 4, 2021

(86) PCT No.: PCT/EP2021/080620
§ 371 (c)(1),
(2) Date: May 5, 2023

(87) PCT Pub. No.: WO2022/101083
PCT Pub. Date: May 19, 2022

(65) Prior Publication Data
US 2023/0405527 A1    Dec. 21, 2023

(30) Foreign Application Priority Data

Nov. 12, 2020   (DE) ............ 10 2020 129 847.1

(51) Int. Cl.
*B01D 61/02* (2006.01)
*B01D 61/10* (2006.01)
(Continued)

(52) U.S. Cl.
CPC .......... *B01D 61/10* (2013.01); *B01D 61/025* (2013.01); *B01D 61/027* (2013.01); *C02F 1/32* (2013.01); *C02F 1/441* (2013.01); *C02F 1/442* (2013.01); *C02F 1/50* (2013.01); *C02F 1/66* (2013.01); *C02F 1/722* (2013.01);
(Continued)

(58) Field of Classification Search
CPC .... B01D 61/10; B01D 61/025; B01D 61/027; B01D 2311/08; B01D 65/08; B01D 2311/2619; B01D 2311/2634; B01D 2321/164; B01D 2321/343; B01D 61/20; C02F 1/32; C02F 1/441; C02F 1/442; C02F 1/50; C02F 1/66; C02F 1/722; C02F 2201/006; C02F 2303/04; C02F 2303/20;
(Continued)

(56) References Cited

U.S. PATENT DOCUMENTS 3,786,924 A  *  1/1974  Huffman ............... B01D 61/08
                                                         210/257.2
3,795,609 A      3/1974  Hill et al.
(Continued)

FOREIGN PATENT DOCUMENTS

DE    202014003627 U1    6/2014
DE    202019101531 U1    6/2019
(Continued)

*Primary Examiner* — Joseph W Drodge
(74) *Attorney, Agent, or Firm* — Smartpat PLC

(57) ABSTRACT

A germ barrier is provided in the concentrate/wastewater drain from a water installation system towards the wastewater sewer in order to prevent backward contamination with germs, using a UV lamp or a chemical germ barrier that contains an alkaline material, in particular a material selected from the group consisting of carbonates, oxides, and peroxides, and combinations thereof.

16 Claims, 5 Drawing Sheets

(51) Int. Cl.
*C02F 1/32* (2023.01)
*C02F 1/44* (2023.01)
*C02F 1/50* (2023.01)
*C02F 1/66* (2023.01)
*C02F 1/72* (2023.01)

(52) U.S. Cl.
CPC .... *B01D 2311/08* (2013.01); *C02F 2201/006* (2013.01); *C02F 2303/04* (2013.01); *C02F 2303/20* (2013.01)

(58) Field of Classification Search
CPC .... C02F 1/44; C02F 1/68; C02F 1/688; C02F 1/444; C02F 1/72; C02F 2307/08
See application file for complete search history.

(56) References Cited

U.S. PATENT DOCUMENTS

| | | | | |
|---|---|---|---|---|
| 5,449,456 A | * | 9/1995 | Bowman | B01D 61/10 210/418 |
| 5,681,459 A | * | 10/1997 | Bowman | B01D 61/10 210/418 |
| 8,419,858 B1 | * | 4/2013 | Haydock | C02F 1/725 134/1 |
| 2006/0016762 A1 | * | 1/2006 | Cha | B09C 1/002 210/757 |
| 2008/0105618 A1 | * | 5/2008 | Beckius | B01D 63/0241 210/500.21 |
| 2008/0290033 A1 | | 11/2008 | Kimball et al. | |
| 2017/0166468 A1 | * | 6/2017 | Gorrell | B01D 61/58 |
| 2018/0016173 A1 | | 1/2018 | Levy et al. | |
| 2018/0257965 A1 | | 9/2018 | Yang et al. | |
| 2018/0370832 A1 | | 12/2018 | Schneider | |
| 2019/0127253 A1 | | 5/2019 | Thomas et al. | |
| 2019/0218121 A1 | | 7/2019 | Buschmann | |
| 2019/0241452 A1 | * | 8/2019 | Ball | C02F 1/70 |
| 2020/0399147 A1 | * | 12/2020 | Yost | C02F 1/4672 |
| 2022/0041483 A1 | * | 2/2022 | Rosansky | C04B 35/62222 |

FOREIGN PATENT DOCUMENTS

| | | |
|---|---|---|
| EP | 0094652 A2 | 11/1983 |
| EP | 3189016 A1 | 3/2016 |
| EP | 3392202 A1 | 10/2018 |

* cited by examiner

INSTALLATION SYSTEM COMPRISING A WASTEWATER LINE

CROSS-REFERENCE TO RELATED APPLICATION

This application is a national stage application, filed under 35 U.S.C. § 371, of International Patent Application No. PCT/EP2021/080620, filed on 4 Nov. 2021, which claims the benefit of German Patent Application No. 10 2020 129 847.1, filed 12 Nov. 2020.

TECHNICAL FIELD

The disclosure relates to an installation system comprising a wastewater sewer and to a method for treating, in particular purifying, water. The disclosure furthermore relates to a water treatment cartridge.

BACKGROUND

Water installation systems such as reverse osmosis systems, backwash filters, or membrane filters usually all include a concentrate/waste water outlet, i.e., drain, towards a wastewater sewer.

Here, backward contamination with germs might occur through direct contact with the wastewater sewer or, in the case of a free outlet, even through the air. Reverse osmosis systems, backflush filters, or membrane filters are merely mentioned as examples, here.

A risk of reverse contamination with germs may, however, also occur in other installation systems.

In particular at the interface from the water installation systems to the wastewater sewer there is a risk of proliferation of microorganisms such as bacteria, fungi, or algae in the water inside the pipes. Below, the term "microorganisms" refers to algae as well as to organisms such as bacteria and fungi.

In order to avoid this, it is possible to install safety fittings such as system separators or a so-called "free outlet" at endangered extraction points. System separators consist of chambers connected in series and having a respective backflow preventer, or non-return valve, connected therebetween. In the case of a free outlet, the supplied water is discharged at a distance from the highest possible level of non-potable water, such as in a conventional sink. This provides a free flow path which prevents water that has flowed out of the water pipe from being sucked back, even if negative pressure builds up in the pipe system.

However, microorganisms can also spread over the air and might thus get into the concentrate/wastewater drain and proliferate there. This can progress to the point of biofilm formation. Therefore, in addition to the risk of introducing microorganisms from non-potable water, there is also the risk of so-called reverse or backward contamination with germ.

In an aqueous environment, single or mixed populations of microorganisms can form biofilms on surfaces such as the inner wall surface of tanks or pipes as well as on filters.

In the case of membrane filters, for example, increased bacterial growth or the formation of biofilms may occur on the concentrate side. In this case, microorganisms will accumulate on the membrane during filtration and will become embedded in a matrix of extracellular polymeric substances (EPS). EPS are formed by microorganisms and released into their environment. The composition of the EPS depends on the species involved in the biofilm. The EPS ensure that the microorganisms adhere to the membrane surface and provide for the mechanical and chemical stability of the biofilm. With increasing thickness of the biofilm, the filtration performance of the membrane will decrease. Furthermore, the increased bacterial growth on the concentrate side can lead to uncontrolled backward contamination with germs into the pipe network.

SUMMARY

Given this background, the disclosure is based on the object to increase the service life and safety of a water installation system, and at the same time to reduce the risk of bacterial backward contamination in the pipe system.

The inventor in particular seeks to provide a device and a method which allows to largely prevent contamination by microorganisms on the concentrate/wastewater side of a water installation system.

The object of the disclosure is already achieved by a water installation system and by a method for preventing backward contamination with germs in a pipe network or in a water installation system according to any of the independent claims.

Preferred embodiments and refinements of the invention will be apparent from the subject-matter of the dependent claims, the description, and the drawings.

The disclosure provides a water installation system, in particular a drinking water system, which comprises an extraction point and/or an outlet, the so-called "point of use", and a drain to a wastewater sewer, and the drinking water system has a direction of flow towards the extraction point and towards the drain, and comprises at least one germ barrier in front of the drain as seen in the direction of flow.

Hence, the germ barrier is placed upstream of the wastewater sewer.

The germ barrier is placed in a water-carrying pipe which is a pipe through which water from a water treatment device is fed into the wastewater sewer.

The drain is in particular in the form of a drain from a device, in particular a single device, for example the concentrate drain of a reverse osmosis system.

Thus, the germ barrier is not arranged at or inside the wastewater sewer, but in a water pipe leading to the wastewater sewer.

The germ barrier may in particular be arranged in the flow path upstream of the outlet, in particular directly in front of the outlet.

Furthermore, the germ barrier may be placed in the flow path of a drain, for example a drain of the concentrate side of a reverse osmosis system.

The germ barrier allows to prevent backward contamination with germs from the wastewater system into the water installation system. This means that in particular a free outlet can be dispensed with in many application cases.

On the other hand, it permits to avoid contamination propagating along the wall of a pipe, in particular the formation of a biofilm.

Below, for the sake of simplicity, the water installation system will also be referred to as a "drinking water system".

The drinking water system is fed from a drinking water source. The drinking water system is delimited towards the drinking water source by an inlet from which drinking water enters the drinking water system, and by the extraction point. The drinking water system preferably constitutes a separately manageable component which can be connected to the water supply, for example in a home. The drinking water system may consist of a plurality of components.

The term "chemical germ barrier" is used in contrast to a "mechanical germ barrier". A mechanical germ barrier is a particle barrier such as a filter, which retains germs by virtue of the respective size ratios. According to one embodiment, the chemical germ barrier comprises a biocidal contact material. "Biocidal contact material" is understood to mean materials which have a bactericidal and/or fungicidal effect and/or an algicidal effect when coming into contact with water.

The germ barrier in particular comprises a material which has an alkalinizing and/or oxidative effect.

In this way, a biocidal effect can be achieved by increasing the pH to above 9, in particular to a pH of more than 10 but preferably less than 13.

Furthermore, the germ barrier can have an oxidative effect, in particular it may produce an oxidative substance such as hydrogen peroxide, for example.

Thus, compared to devices without such means, the invention permits to reduce or almost completely prevent a formation of biofilms and the growth of algae in a drain from the water treatment device.

The germ barrier thus prevents germs or a biofilm from growing through the drain.

The germ barrier is in particular designed so that water is chemically treated in a section of the flow path in such a way that microorganisms are killed within this section. The germ barrier in particular prevents the growth of germs along a pipeline wall against the direction of flow.

In an advantageous embodiment, the alkalinizing and/or oxidative material comprises at least one material selected from the group consisting of carbonates, oxides, and peroxides.

Particularly suitable for being used within the scope of the invention are calcium carbonate, magnesium carbonate, calcium oxide, magnesium oxide, magnesium peroxide, calcium peroxide, sodium peroxide, potassium peroxide, and zinc peroxide, and mixtures of at least two of the materials mentioned.

An appropriate peroxide in particular permits to increase the pH as well as to release hydrogen peroxide into the water.

Thus, several chemical germ barriers are eligible for the drinking water system within the scope of the invention, depending on the application case and external conditions.

Furthermore, as a further germ barrier, it is also possible to use a cartridge comprising a UV lamp which fights the germs with ultraviolet light inside the drain from the water installation system.

In view of particularly simple assembly, it is intended that a drain from the drinking water system, which leads to the wastewater sewer, comprises a connection component for connecting at least one cartridge that comprises a germ barrier.

The connection component is configured such that the germ barrier can be inserted into the connection component.

According to one embodiment, the water treatment device and the germ barrier are replaceable independently from one another. This provides for particularly simple handling of the water treatment device and the germ barrier, allowing for safe operation and at the same time cost-effective maintenance of the drinking water system.

Especially agglomerated materials which largely prevent the formation of dust are easy to handle.

According to one exemplary embodiment, the germ barrier comprises an alkalinizing and/or oxidative material which comprises particles that have a particle size of less than 5 mm, preferably less than 3 mm, most preferably in the range between 0.2 mm and 10 mm, preferably between 0.5 mm and 2.5 mm.

The particle sizes given above relate to the initial state of the respective alkalinizing and/or oxidative material. An upper limit for the particle size of the material is in particular determined by the desired dissolution kinetics. In principle, the use of powder is also possible. Preferred are materials comprising particles that are larger than 20 µm, more preferably larger than 100 µm, most preferably larger than 200 µm, so that the flow resistance of the material will be reduced compared to a bed consisting of smaller particles.

The granulated materials dissolve sufficiently slowly in water, such that the pH value of the water in the cartridge is increased so that the desired biocidal effect can be established. In this way, the invention helps to reduce or virtually completely prevent the formation of biofilms and the growth of algae. The alkalinizing and/or oxidative material is in particular configured such that the OH concentration increases to an extent so that the pH increases to between 10 and 13.

Influence of the pH on bacterial growth:

All microorganisms have a pH range within which growth is possible, i.e., an optimum pH range. Most natural environments have a pH between 4 and 9, and the pH optimum of many microorganisms is exactly within this range.

The bacteria most commonly found in drinking water, such as *Legionella, Pseudomonas, E.coli* and *enterococci*, have their pH optimum in exactly this range.

| Bacterium | pH optimum | pH range allowing for growth |
|---|---|---|
| *E. coli* | 7-7.5 | 5.5-9 |
| Enterococci | 7.5 | 4.6-9.9 |
| Legionella | 7 | 5-8.1 |
| *Pseudomonas ae.* | 7.0-7.5 | 4.5-9.5 |

While the extracellular pH value has an impact on the growth of the bacteria, the intracellular pH must remain close to neutrality (with the exception of extremely acidophilic or alkaliphilic bacteria), since DNA is an acid-labile structure and RNA is an alkali-labile structure. If the extracellular pH is outside the pH optimum or outside the range in which growth is still possible (see table), the bacteria will no longer be able to stabilize the intracellular pH value. This will slow down or stop bacterial growth or lead to the death of the bacteria.

Thus, in a surprisingly simple manner, the invention provides a chemical germ barrier which has a biocidal effect that is based on an increase in the OH concentration such that a pH value between 10 and 13 is established.

In one embodiment, the chemical germ barrier can be provided with a housing having an internal volume in the range from 10 ml to 200 ml, preferably an internal volume in the range between 15 ml and 50 ml, and can thus be extremely compact.

The disclosure furthermore relates to a cartridge which includes a germ barrier consisting of a UV lamp that fights germs with ultraviolet light.

BRIEF DESCRIPTION OF THE DRAWINGS

The invention is illustrated in more detail in the attached drawings by way of exemplary embodiments. The same and similar components are denoted by the same reference numerals, while the features of the various exemplary embodiments can be combined with one another.

DETAILED DESCRIPTION

Figure 1:
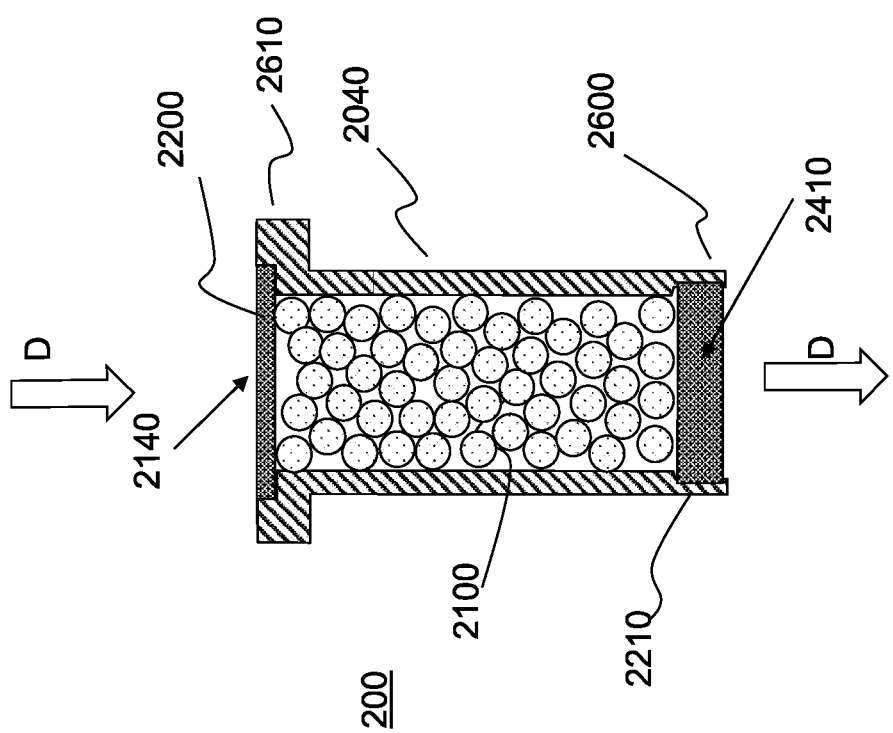
FIG. 1 is a schematic view of a cartridge comprising an alkalinizing and/or oxidative material that is effective as a germ barrier.

FIG. 1 illustrates a chemical germ barrier 200 comprising an alkalinizing and/or oxidative material 2100. The chemical germ barrier 200 has a direction of flow D, and the material 2100 is placed upstream of the wastewater sewer as seen in the direction of flow D.

In order to be able to handle the chemical germ barrier 200 separately and independently of an optionally provided water treatment unit, the chemical germ barrier 200 has a retention grid or a fleece 2210 on the input side as well as on its output side 2410 in these variants of the invention.

The chemical germ barrier contains at least one material selected from the group consisting of carbonates, oxides, and peroxides.

Particularly suitable for being used within the scope of the invention are calcium carbonate, magnesium carbonate, calcium oxide, magnesium oxide, magnesium peroxide, calcium peroxide, sodium peroxide, potassium peroxide, and zinc peroxide, and mixtures of at least two of the materials mentioned.

In the illustrated embodiments, the chemical germ barrier 200 has fastening means 2600 on its input side 2140 and also fastening means 2600 on its output side 2410. These may be in the form of a flange or thread, for example.

Figure 2:
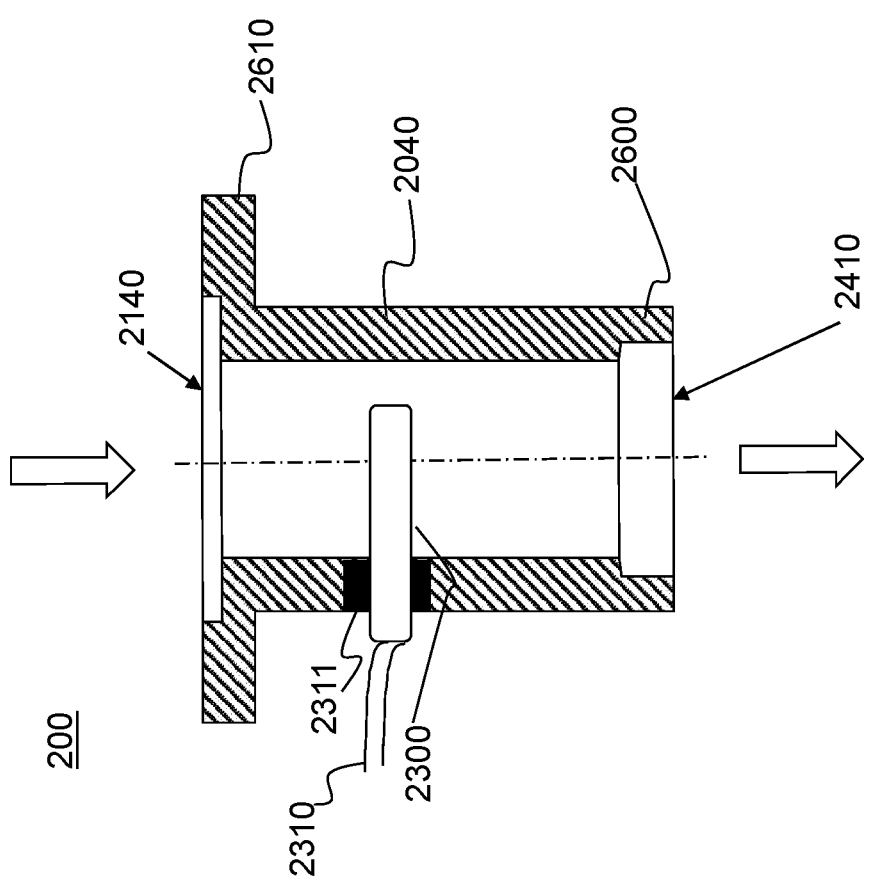
FIG. 2 is schematic view of a cartridge comprising a UV lamp that is effective as a germ barrier.

FIG. 2 shows a germ barrier 200 comprising a UV lamp 2300. The UV lamp 2300 protrudes into the interior of the cartridge 2040 which defines a housing of the germ barrier 200. The UV lamp 2300 has an electrical power connection 2310. A seal 2311 is arranged between the housing wall 2040 and the UV lamp 2300. Inside the cartridge, the concentrate/waste water will be exposed to UV radiation so that germs are killed.

The germ barriers shown in FIGS. 1 and 2 can be used for the exemplary embodiments of water installation systems described below.

Figure 3:
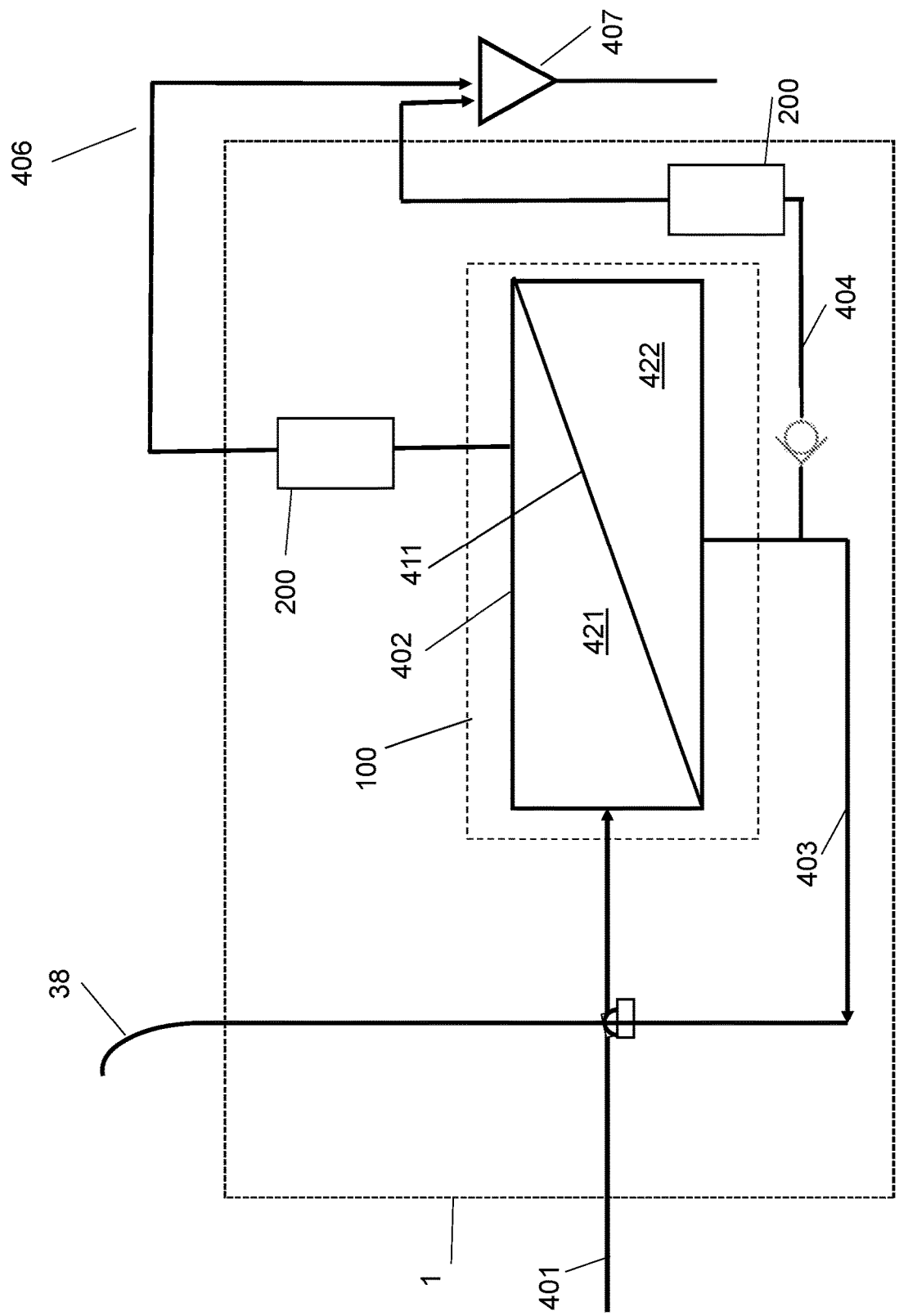
FIG. 3 is a schematic view of a water installation system involving reverse osmosis.

FIG. 3 shows an embodiment in the form of a water installation system 1 comprising a water treatment device 100 in the form of a reverse osmosis system.

The water treatment device 100 is supplied with input water from a water source via a pipe 401. During operation, treated water from the water treatment device 100 can be extracted at an extraction point 38 via extraction line 403.

The reverse osmosis tank 402 has a first chamber 421 and a second chamber 422. A semi-permeable membrane 411 is arranged between the chambers 421, 422. During operation, the input water is passed through the semi-permeable membrane 411. Substances dissolved in the input water are held back in the first chamber 421 so that a concentrate is produced.

The concentrate can be discharged via a drain, namely the concentrate line 406, and can be discarded via a wastewater line 407 which leads to the wastewater sewer (not shown). Even if a so-called "free outlet" is provided, as shown here, there is a risk of reverse or backward contamination with germs from the wastewater line 407. To counteract such backward germ contamination, a germ barrier 200 is arranged in the concentrate line 406.

During operation, water with a reduced concentration of dissolved substances will enter the second chamber 422. This permeate, being the treated water, is fed to the extraction point 38, here embodied as a faucet, via a line 403.

In addition to the line 406 from the concentrate side to the wastewater sewer 407, there is a second line 404 to the wastewater sewer in this example, namely from the permeate side. When reverse osmosis starts, for example after a stagnation phase, the first permeate is often discarded, since for instance heavy metals and other pollutants which are retained during operation, might still diffuse to the permeate side during the stagnation phase. The wastewater of the so-called first permeate, which is discarded via line 404, can also be passed through a germ barrier as well.

According to a further embodiment, not shown, lines 404 and 406 can be merged and routed through a shared germ barrier 200 before reaching the wastewater sewer 407.

Similarly to the application for a reverse osmosis system as illustrated in FIG. 3, the germ barrier can also be used for a nanofiltration process which functions similarly to reverse osmosis and, in terms of its basic principle, merely involves a membrane with a larger pore diameter.

Figure 4:
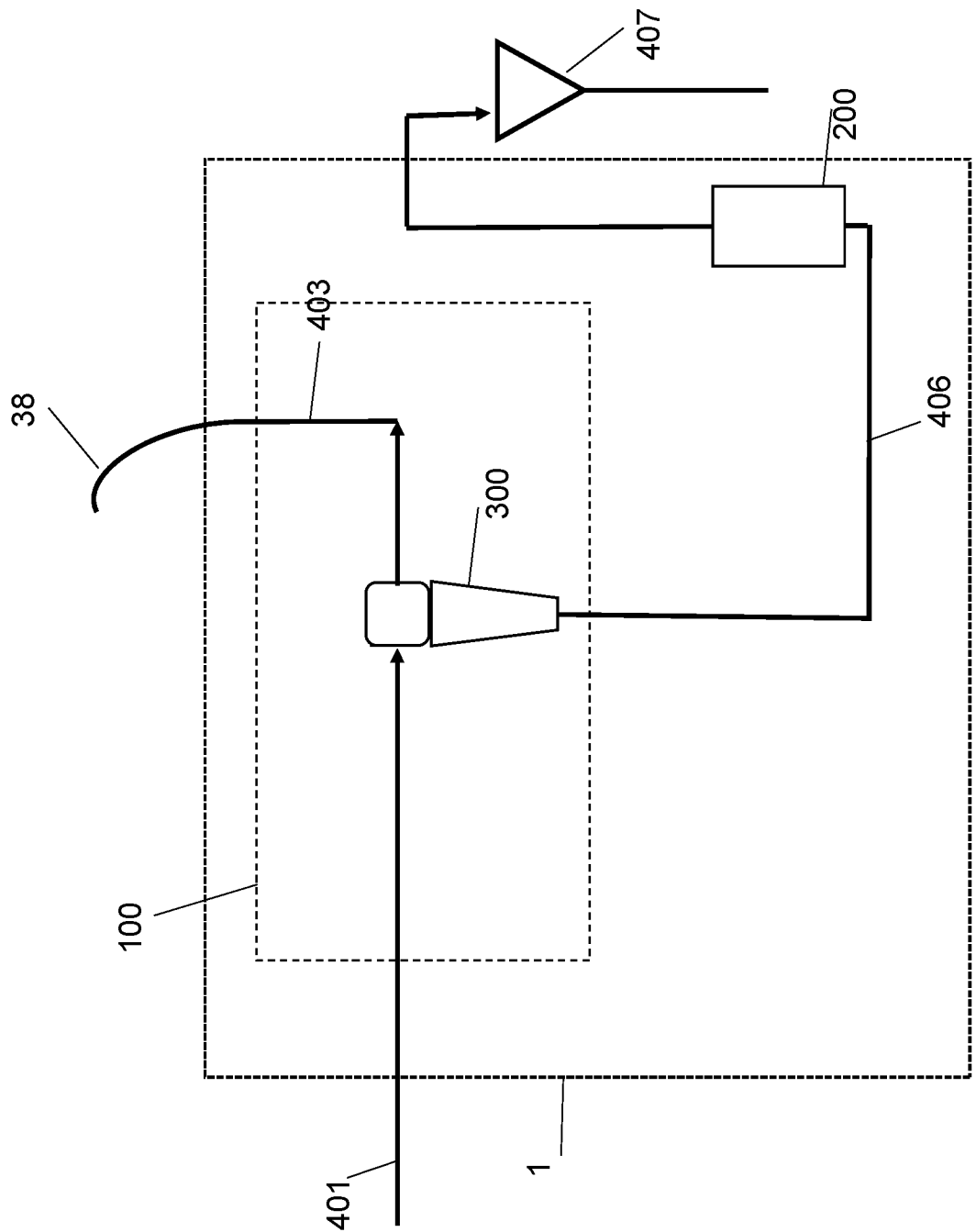
FIG. 4 is a schematic view of a water installation system comprising a backwash filter.

FIG. 4 shows an embodiment of a water treatment device 100 comprising a backwash filter 300.

Input water is supplied to the water treatment device 100 from a water source. Water that has been treated during operation can be extracted from the water treatment device 100 via extraction line 403.

During operation of the backwash filter 300, deposits may accumulate on the filter surface. In order to clean the backwash filter 300 from these deposits, the backwash filter 300 is backwashed against its normal direction of flow. The wastewater produced during the backwashing is discarded via a wastewater line 407. Here, again, there is a risk of backward germ contamination from the wastewater line 407.

In order to prevent such backward contamination with germs, a germ barrier is arranged in the line 406.

Figure 5:
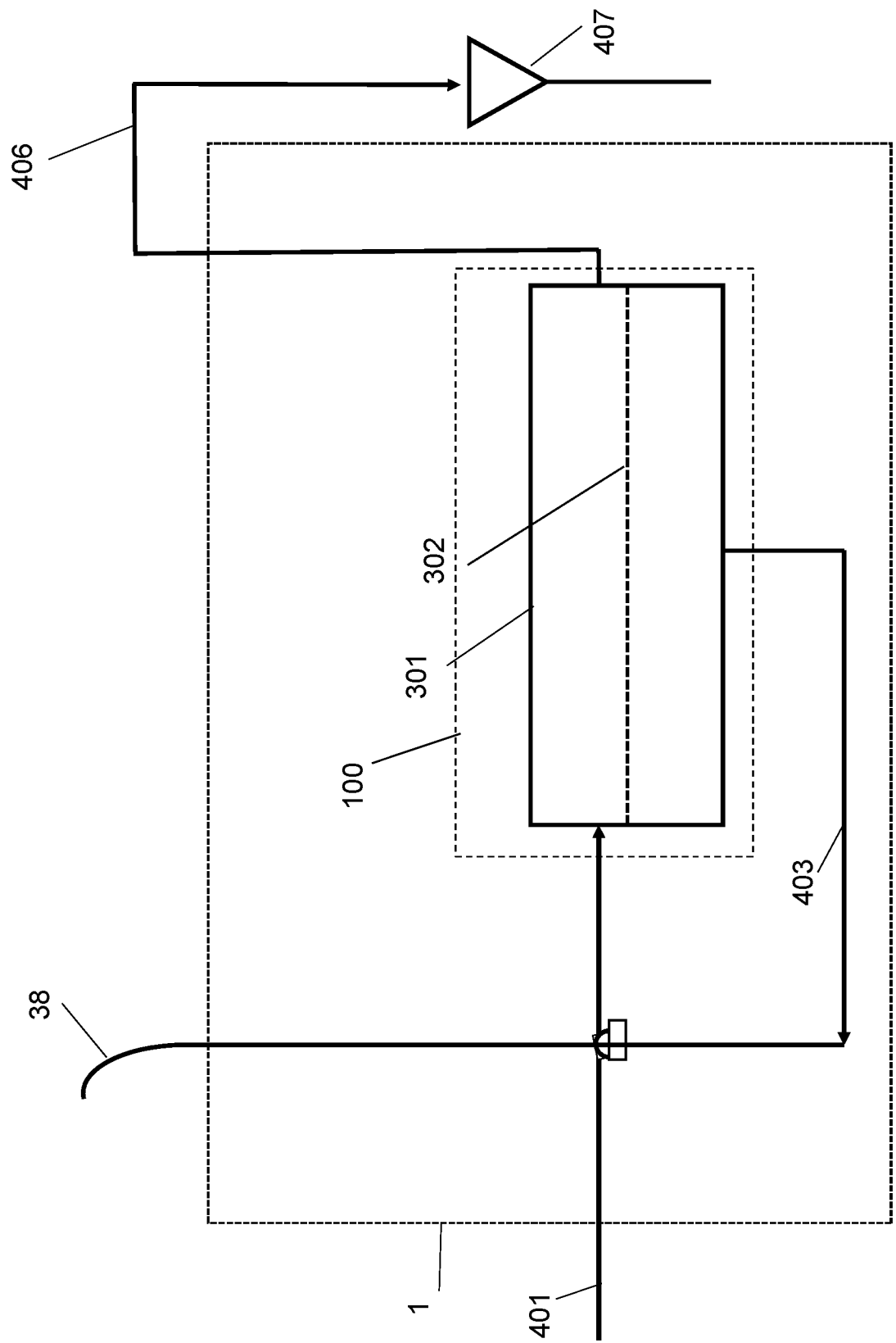
FIG. 5 is a schematic view of a water installation system comprising a membrane filter operated in tangential flow filtration.

FIG. 5 shows an embodiment of a water treatment device 100 comprising a membrane filter 301 that is operated in tangential flow filtration.

Input water is supplied to the water treatment device 100 from a water source. Water that has been treated during operation can be extracted from the water treatment device 100 via extraction line 403.

In tangential flow filtration, the liquid to be filtered flows parallel to a membrane 302 or another filter medium, and the permeate is drawn off transversely to the direction of flow. The comparatively high speed largely prevents the accumulation of a filter cake (covering layer or fouling) of the solid particles to be separated off on the membrane 302. Hollow fibers (referred to as capillary membranes) are particularly suitable for this purpose.

The filtrate is free of solids. The fraction of the liquid flow that does not pass through the membrane, i.e., the retentate, is discharged into the wastewater sewer 407. Here exists a risk of backward contamination with germs of the wastewater line 406. In order to counteract such backward germ contamination, a germ barrier 200 is arranged in the line 406.

It will be apparent to a person skilled in the art that the invention is not limited to the examples described above but can rather be varied in various ways.

LIST OF REFERENCE NUMERALS

1 Water system
200 Chemical germ barrier
2040 Cartridge
2140 Inlet side of cartridge
2410 Outlet side of cartridge
2100 Alkalinizing and/or oxidative material
2200 Retention grid, fleece
2210 Retention grid, fleece
2600 Fastening means, flange, thread
2610 Fastening means, flange, thread
2300 UV lamp
2310 Electrical power connection
2311 Seal
401 Pipe for input water, raw water, water to be treated, feed
402 Reverse osmosis tank
421 First chamber of reverse osmosis tank
422 Second chamber of reverse osmosis tank
403 Permeate line, line for treated water
404 Waste water line for "first permeate"
406 Pipe/concentrate line
407 Wastewater sewer
411 Semi-permeable membrane
38 Extraction point
100 Water treatment device
300 Backwash filter
301 Membrane filter
302 Membrane
D Direction of flow

What is claimed is:

1. A water installation system connectable to a home water supply, comprising:
a water filtration device;
an input line configured for supplying raw drinking water from a drinking water source to the water filtration device:
an extraction line configured for delivering treated drinking water from the water filtration device to a faucet;
a drain line for discharging wastewater from the water filtration device to a wastewater sewer; and
a germ barrier disposed in the drain line downstream of the water filtration device and upstream of the wastewater sewer.

2. The water installation system of claim 1, wherein the germ barrier is a chemical germ barrier arranged within a housing having an internal volume between 15 ml and 200 ml.

3. The water installation system of claim 2, wherein the chemical germ barrier comprises an alkalinizing or oxidative material.

4. The water installation system as claimed in claim 1, wherein the germ barrier comprises an alkalinizing or oxidative material selected from the group consisting of carbonates, oxides, and peroxides.

5. The water installation system of claim 4, wherein the alkalinizing or oxidative material is agglomerated to reduce dust formation.

6. The water installation system as claimed in claim 1, wherein the germ barrier comprises one or more of calcium carbonate, magnesium carbonate, calcium oxide, magnesium oxide, magnesium peroxide, calcium peroxide, sodium peroxide, potassium peroxide, and zinc peroxide.

7. The water installation system of claim 1, wherein the germ barrier comprises a UV lamp arranged within a housing.

8. The water installation system as claimed in claim 1, wherein the germ barrier comprises a replaceable cartridge.

9. The water installation system of claim 8, wherein the replaceable cartridge comprises a retention grid or fleece at an inlet side of the replaceable cartridge and a further retention grid or fleece at an outlet side of the replaceable cartridge.

10. The water installation system as claimed in claim 1, wherein the water filtration device is at least one of a reverse osmosis system, a nanofilter, or a tangential flow membrane filter.

11. The water installation system of claim 1, wherein the germ barrier is arranged directly upstream of an outlet of the drain line to the wastewater sewer.

12. The water installation system of claim 1, wherein the water filtration device is a reverse osmosis system, and wherein the water installation system further comprises a permeate flush line in fluid for discarding first permeate from the reverse osmosis system to the wastewater sewer, and a further germ barrier disposed in the permeate flush line.

13. The water installation system of claim 1, wherein the germ barrier is configured to counteract contamination of germs in the drain line when wastewater is flowing in a direction opposite to a flow direction from the water filtration device to the wastewater sewer.

14. A method for treating water, comprising:
supplying raw drinking water through an input line from a drinking water source to a water filtration device;
delivering treated drinking water from the water filtration device to a faucet through an extraction line;
discharging wastewater from the water filtration device to a wastewater sewer through a drain line; and
passing the wastewater through a chemical germ barrier arranged in the drain line.

15. The method of claim 14, further comprising causing an OH concentration in the wastewater to rise within the chemical germ barrier to such an extent that a pH value between 10 and 13 is established.

16. A method for treating water, comprising:
supplying raw drinking water through an input line from a drinking water source to a water filtration device;
delivering treated drinking water from the water filtration device to a faucet through an extraction line;
discharging wastewater from the water filtration device to a wastewater sewer through a drain line; and
subjecting the wastewater to UV light by passing the wastewater through a germ barrier that comprises a UV lamp, the germ barrier being arranged in the drain line.

* * * * *